(12) United States Patent
Yang et al.

(10) Patent No.: US 9,611,818 B2
(45) Date of Patent: Apr. 4, 2017

(54) INTEGRATED EGR VALVE HOUSING

(71) Applicants: HYUNDAI MOTOR COMPANY, Seoul (KR); Kia Motors Corporation, Seoul (KR)

(72) Inventors: Il Suk Yang, Hwaseong-si (KR); Kyoung Hee Kim, Ansan-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 156 days.

(21) Appl. No.: 14/693,162

(22) Filed: Apr. 22, 2015

(65) Prior Publication Data

US 2016/0160812 A1 Jun. 9, 2016

(30) Foreign Application Priority Data

Dec. 3, 2014 (KR) .......................... 10-2014-0172182

(51) Int. Cl.
*F02M 25/07* (2006.01)
*F02M 26/73* (2016.01)
*F02M 26/30* (2016.01)
*F01P 3/02* (2006.01)
*F01P 7/16* (2006.01)

(52) U.S. Cl.
CPC .............. *F02M 26/73* (2016.02); *F01P 3/02* (2013.01); *F01P 7/16* (2013.01); *F02M 26/30* (2016.02); *F01P 2003/024* (2013.01)

(58) Field of Classification Search
CPC . F02M 26/73; F02M 26/30; F01P 7/16; F01P 3/02; F01P 2003/024

USPC ........................................ 123/568.12, 41.01
See application file for complete search history.

(56) References Cited

U.S. PATENT DOCUMENTS

| | | | | |
|---|---|---|---|---|
| 6,237,547 | B1 * | 5/2001 | Ishiyama | F02M 35/10131 123/41.31 |
| 6,871,699 | B1 * | 3/2005 | Boyd | F01P 3/12 123/41.31 |
| 6,976,480 | B2 * | 12/2005 | Miyoshi | F02M 26/57 123/568.12 |
| 2007/0017491 | A1 | 1/2007 | Maeda | |

(Continued)

FOREIGN PATENT DOCUMENTS

| JP | 10-259763 A | 9/1998 |
|---|---|---|
| JP | 2000-008973 A | 1/2000 |

(Continued)

*Primary Examiner* — Hai Huynh
(74) *Attorney, Agent, or Firm* — McDermott Will & Emery LLP

(57) ABSTRACT

An integrated exhaust gas recirculation (EGR) valve housing includes: a temperature control passage configured to include a first cooling channel which connects a water jacket formed in an engine to a radiator and a second cooling channel which is branched from the first cooling channel and extends to an EGR cooler cooling re-circulated exhaust gas; and an auxiliary cooling passage configured to guide cooling water introduced into the second cooling channel to the EGR valve housing, whereby it is possible to easily dispose the EGR valve housing in the engine compartment by integrating the parts through which the cooling water is discharged from the engine with the cooling water channel connected to the EGR valve housing.

13 Claims, 7 Drawing Sheets

(56) References Cited

U.S. PATENT DOCUMENTS

2015/0167596 A1* 6/2015 Tiru ................. F02M 26/73
123/568.12

FOREIGN PATENT DOCUMENTS

| | | |
|---|---|---|
| JP | 2000-087807 A | 3/2000 |
| JP | 2005-325766 A | 11/2005 |
| JP | 2009-127512 A | 6/2009 |
| JP | 2010-024872 A | 2/2010 |
| JP | 2010-078002 A | 4/2010 |
| KR | 10-0804376 B1 | 2/2008 |

* cited by examiner

INTEGRATED EGR VALVE HOUSING

CROSS-REFERENCE TO RELATED APPLICATION

This application is based on and claims the benefit of priority to Korean Patent Application No. 10-2014-0172182, filed on Dec. 3, 2014 in the Korean Intellectual Property Office, the disclosure of which is incorporated herein by reference in its entirety.

TECHNICAL FIELD

The present disclosure relates to an integrated exhaust gas recirculation (EGR) valve housing, and more particularly, to an integrated EGR valve housing capable of simplifying the layout design of an engine compartment.

BACKGROUND

An exhaust gas recirculation system (EGR system) is configured of a separate EGR valve and an EGR valve housing including the same, in which the EGR valve housing is fixed to an engine compartment.

The EGR valve is an apparatus which controls a re-circulated amount of exhaust gas. The EGR valve housing is configured so that the EGR valve may be inserted into and seated in the EGR valve housing. The EGR valve housing is further configured of a channel through which exhaust gas may be introduced and discharged and may be provided with a flange so that the EGR valve may be provided with a pipe connected to the channel. Further, the EGR valve housing may be provided with a boss and the flange so as to be connected to an intake and exhaust system.

However, the volume of the EGR valve housing is increased and thus it is difficult to choose a position of the EGR valve according to a layout of the engine compartment. The high temperature EGR gas is re-circulated through the EGR valve. In this case, to prevent the EGR valve from being damaged due to heat which may be generated in the EGR valve, the EGR valve needs to be provided with a separate cooling circuit and a cooling water channel for supplying cooling water to the cooling circuit. Further, providing the cooling circuit and the cooling water channel in the EGR valve housing leads to an increase in vehicle costs.

SUMMARY

The present disclosure has been made to solve the above-mentioned problems occurring in the prior art while advantages achieved by the prior art are maintained intact.

An aspect of the present disclosure provides an integrated EGR valve housing capable of easily disposing the EGR valve housing in an engine compartment by integrating parts through which cooling water is discharged from an engine with a cooling water channel supplying the cooling water to the EGR valve housing.

According to an exemplary embodiment of the present disclosure, an integrated EGR valve housing includes: a first temperature control passage configured to include a first cooling channel which connects a water jacket formed in an engine to a radiator and a second cooling channel which is branched from the first cooling channel and extends to an EGR cooler cooling re-circulated exhaust gas; and an auxiliary cooling passage configured to guide cooling water introduced into the second cooling channel to the EGR valve housing.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
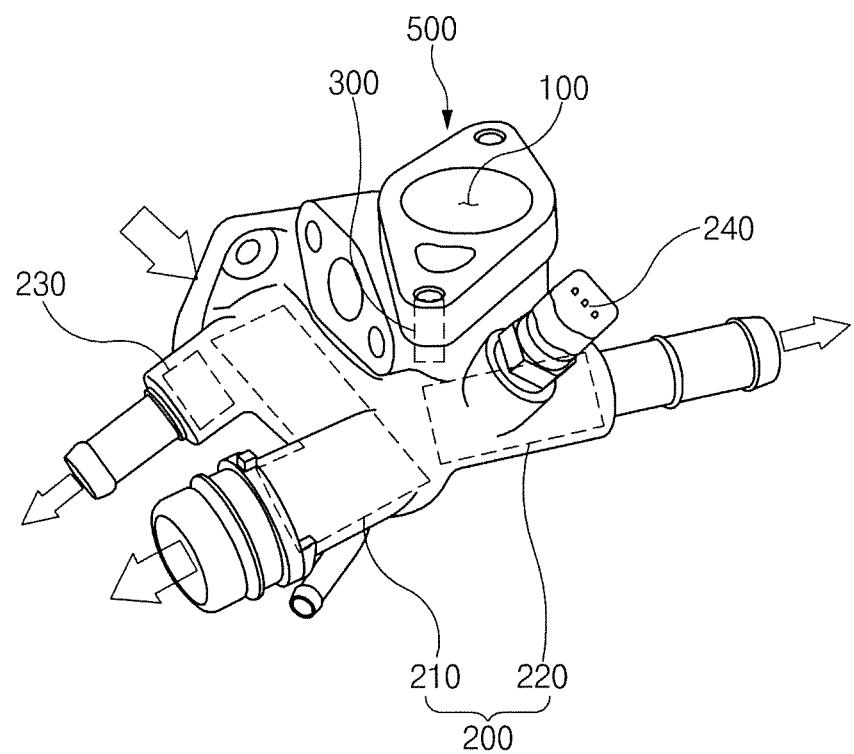
FIG. 1 is a perspective view of an integrated EGR valve housing according to an exemplary embodiment of the present disclosure.
Figure 2:
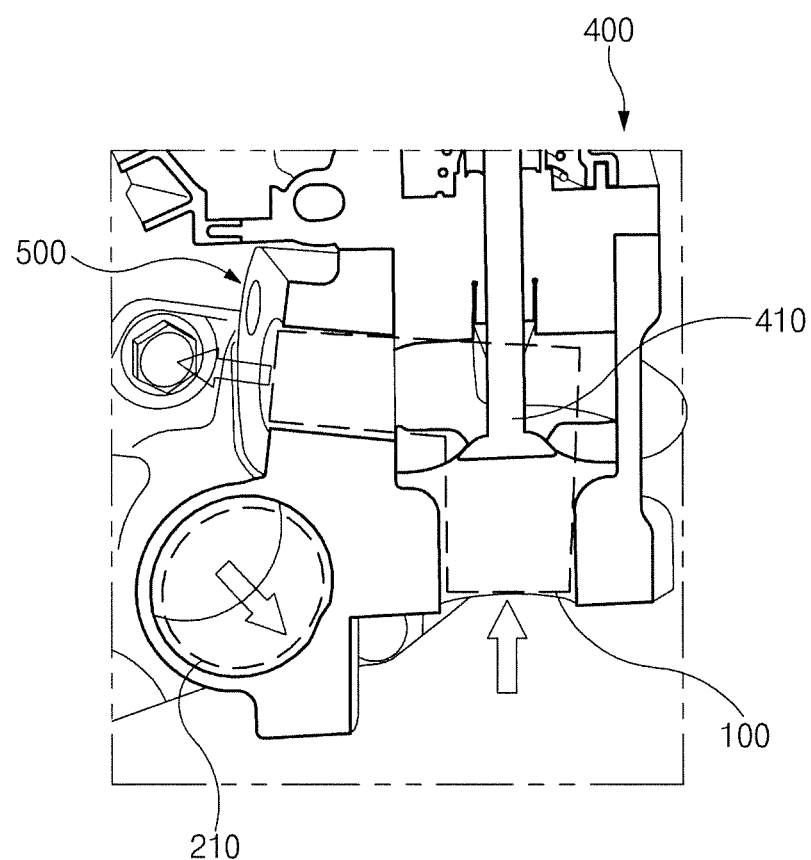
FIG. 2 is a cross-sectional view of main parts of the integrated EGR valve housing of FIG. 1.
Figure 3:
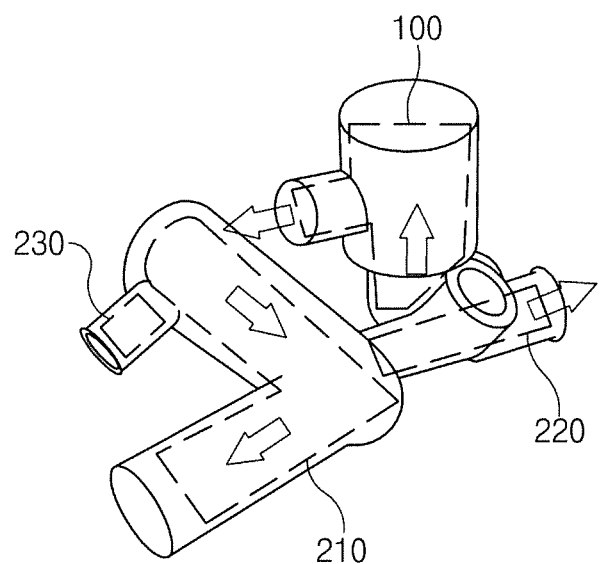
FIG. 3 is a perspective view of the integrated EGR valve housing of FIG. 1.
Figure 4:
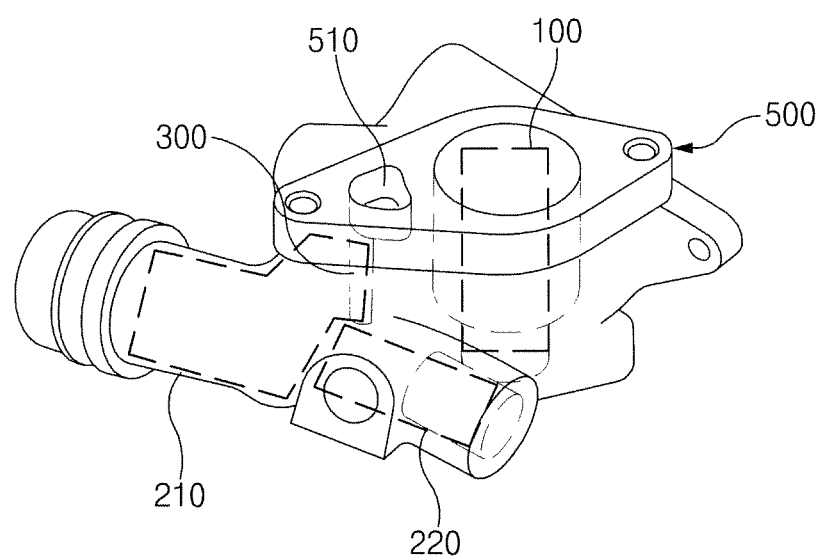
FIG. 4 is a perspective view illustrating a state in which the integrated EGR valve housing of FIG. 1 is provided with a flange.

Exemplary embodiments of the present disclosure will be described in detail with reference to the accompanying drawings.

As illustrated in FIGS. 1 to 7, a cooling water circulation structure which supplies cooling water to an EGR valve housing 400 according to an exemplary embodiment of the present disclosure includes: an exhaust gas circulation passage 100 configured to be mounted in the EGR valve housing 400 through a flange 500 and to be opened and closed by an EGR valve 410; a first temperature control passage 200 configured to include a first cooling channel 210 which is provided at one side of an exhaust gas circulation passage 100 and connects a water jacket formed in a cylinder head to a radiator and a second cooling channel 220 which is branched from the first cooling channel 210 and connects the first cooling channel 210 to an EGR cooler; and an auxiliary cooling passage 300 which is branched from the second cooling channel 220 and connects the water jacket to the EGR valve housing 400.

According to the exemplary embodiment of the present disclosure, the cooling water circulation structure further includes a second temperature control passage 230 configured to be branched from a first cooling channel and guide the cooling water flowing between the water jacket and the radiator to a thermostat. When a temperature of the cooling water is equal to or less than a specific value, the thermostat shuts off the first cooling channel 210 to prevent the cooling water from flowing between the water jacket and the radiator. The second cooling channel 220 is provided with a sensor 240 which may measure the temperature of the cooling water.

Figure 5:
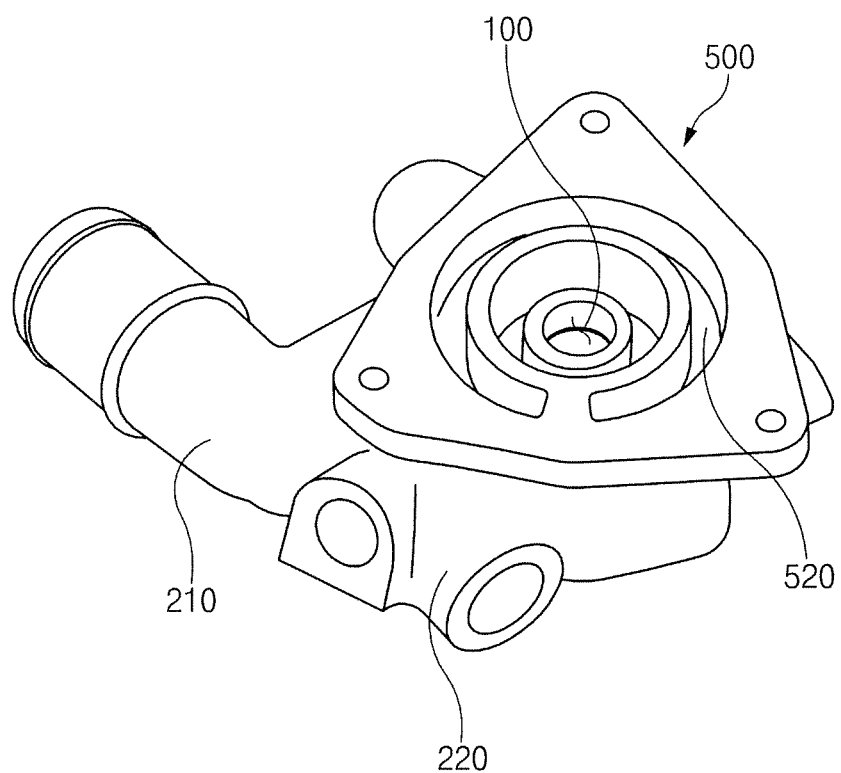
FIG. 5 is another perspective view illustrating a state in which the integrated EGR valve housing of FIG. 1 is provided with the flange.

The auxiliary cooling passage 300 is connected to a flange space part 510 which is formed in the flange 500 and is connected to a cooling circuit which is formed in the EGR valve housing 400 through the flange space part 510. In this case, it is possible to cool the EGR valve housing 400 by deforming a shape of the flange space part 510. FIG. 5 illustrates that the flange space part 510 is deformed to form a circulation circuit 520 enclosing an outer diameter of the exhaust gas circulation passage 100.

Figure 6:
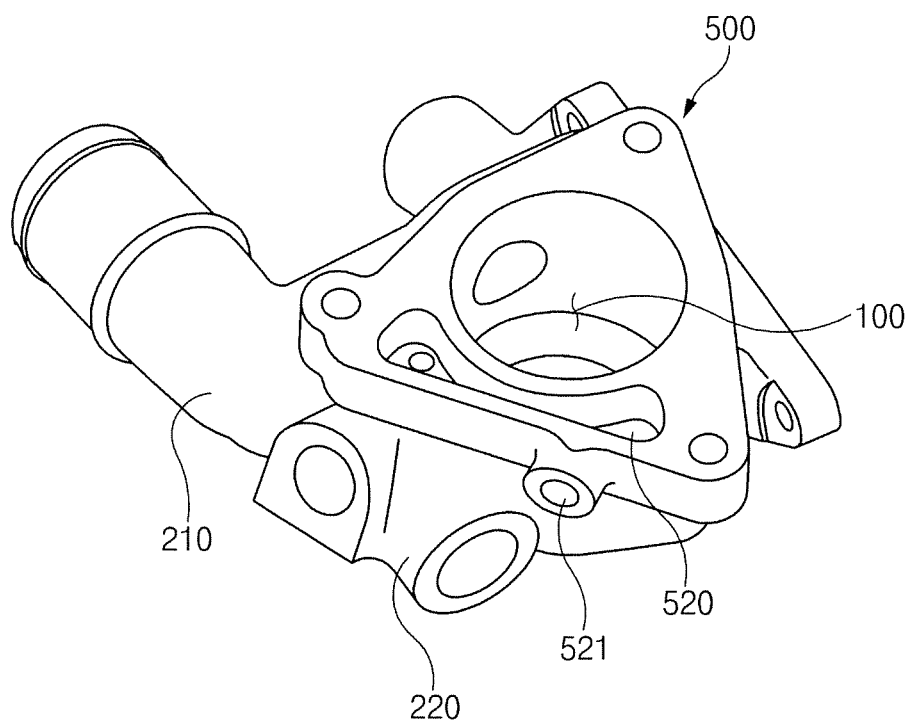
FIG. 6 is still another perspective view illustrating a state in which the integrated EGR valve housing of FIG. 1 is provided with the flange.

As illustrated in FIGS. 5 and 6, the circulation circuit 520 may be formed to enclose the overall outer diameter of the exhaust gas circulation passage 100 or only a specific portion thereof. In particular, as illustrated in FIG. 6, an outlet 521 through which the cooling water is discharged from the circulation circuit 520 may also be branched.

In the cooling water circulation structure supplying the cooling water to the EGR valve housing 400 according to the exemplary embodiment of the present disclosure configured as described above, the exhaust gas circulation passage 100 which is opened and closed by the EGR valve 410 is positioned to be maximally closed to the first temperature control passage 200 through which the cooling water moves to the radiator from the water jacket.

By this configuration, the cooling water flowing between the water jacket and the radiator may be used to cool the EGR valve 410 and to cool the EGR valve 410 and a necessity of installation of the separate pipe supplying the cooling water to the EGR valve 410 is removed.

Figure 7:
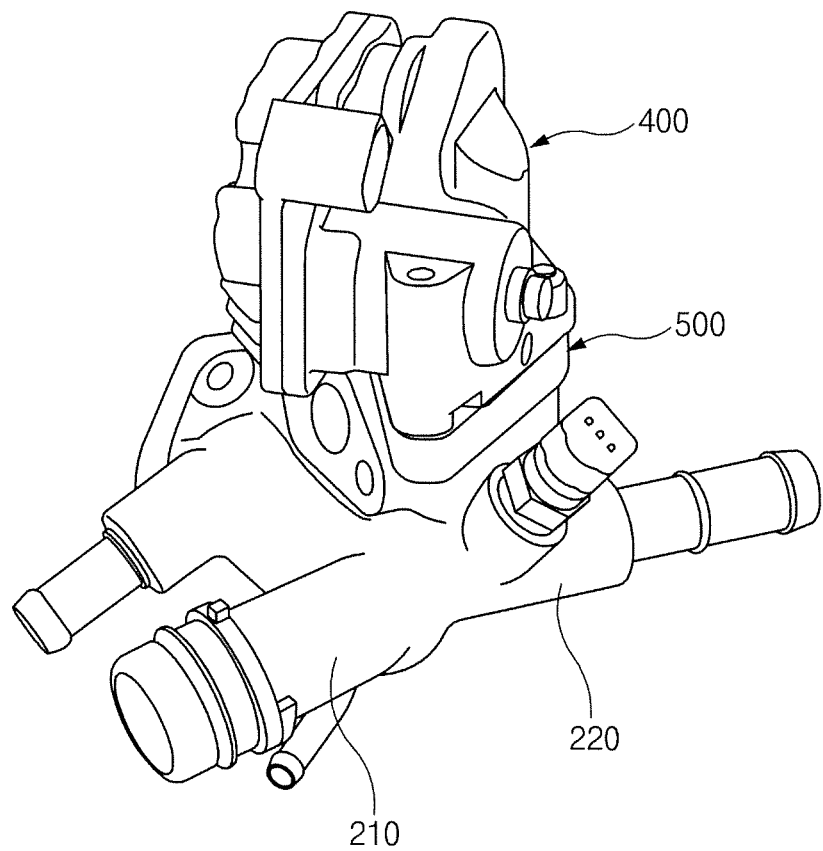
FIG. 7 is a perspective view illustrating a state in which the integrated EGR valve housing of FIG. 1 is applied to an EGR valve housing.

FIG. 7 illustrates the EGR valve housing 400 to which the cooling water circulation structure supplying the cooling water to the EGR valve housing 400 according to the exemplary embodiment of the present disclosure is applied. As illustrated in FIG. 7, the EGR valve housing 400 is positioned at an upper end of the first temperature control passage 200 and therefore may be mounted in all the vehicle models which use the same engine. Further, the volume of the EGR valve housing is minimized and the layout of the engine compartment may be easily designed. Further, the number of pipes connected to the EGR valve housing 400 is minimized, and therefore a length of the EGR pipe may be shortened, thereby maximizing the EGR effect.

Further, the auxiliary cooling passage 300, the flange space part 510, or the circulation circuit 520 which are described above are formed, thereby increasing the cooling efficiency of the EGR valve 410 and the cooling efficiency of the EGR gas. In particular, the cooling efficiency of the EGR valve 410 is improved and therefore the quality and durability of the EGR valve 410 may be secured.

As described above, according to the integrated EGR valve housing in accordance with the exemplary embodiments of the present disclosure, it is possible to easily disposing the EGR valve housing in the engine compartment by integrating the parts through which the cooling water is discharged from the engine with the cooling water channel connected to the EGR valve housing.

Further, it is possible to reduce a total number of parts by integrating the parts so as to save the manufacturing costs of the vehicle.

Further, it is possible to improve the effect of reducing the temperature of the EGR gas.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An integrated exhaust gas recirculation (EGR) valve housing, comprising:
   an exhaust gas circulation passage mounted in an EGR valve housing through a flange and configured to be opened and closed by an EGR valve;
   a first temperature control passage including a first cooling channel which is provided at one side of the exhaust gas circulation passage and connects a water jacket formed in a cylinder head to a radiator and a second cooling channel which is branched from the first cooling channel and connects the first cooling channel to an EGR cooler; and
   an auxiliary cooling passage branched from the second cooling channel and connecting the water jacket to the EGR valve housing.

2. The integrated EGR valve housing according to claim 1, further comprising:
   a second temperature control passage branched from the first cooling channel and guiding cooling water flowing between the water jacket and the radiator to a thermostat.

3. The integrated EGR valve housing according to claim 2, wherein when a temperature of the cooling water is equal to or less than a predetermined value, the thermostat shuts off the first cooling channel to prevent the cooling water from flowing between the water jacket and the radiator.

4. The integrated EGR valve housing according to claim 1, wherein the second cooling channel is provided with a sensor configured to measure the temperature of the cooling water.

5. The integrated EGR valve housing according to claim 1, wherein the auxiliary cooling passage is connected to a flange space part which is formed in the flange and is connected to a cooling circuit which is formed in the EGR valve housing through the flange space part.

6. The integrated EGR valve housing according to claim 1, wherein the auxiliary cooling passage is connected to a circulation circuit which is formed in the flange to enclose an outer diameter of the exhaust gas circulation passage.

7. The integrated EGR valve housing according to claim 6, wherein the circulation circuit is connected to a cooling circuit which is formed in the EGR valve housing.

8. The integrated EGR valve housing according to claim 6, wherein the circulation circuit is provided with an outlet through which cooling water introduced through the auxiliary cooling passage is discharged to the outside.

9. An integrated exhaust gas recirculation (EGR) valve housing, comprising:
   a first cooling channel connecting a water jacket formed in an engine to a radiator;
   a second cooling channel branched from the first cooling channel and extending toward an EGR cooler cooling re-circulated exhaust gas; and
   an auxiliary cooling passage branched from the second cooling channel and guiding cooling water introduced into the second cooling channel to an EGR valve housing.

10. The integrated EGR valve housing according to claim 9, further comprising:
    an exhaust gas circulation passage formed to parallel to the auxiliary cooling passage and guiding exhaust gas to the EGR valve housing.

11. The integrated EGR valve housing according to claim 10, wherein the auxiliary cooling passage is connected to a flange space part which is formed in a flange which mounts the exhaust gas circulation passage in the EGR valve housing.

12. The integrated EGR valve housing according to claim 10, wherein the exhaust gas circulation passage includes a flange which is formed in the exhaust gas circulation passage to mount the exhaust gas circulation passage in the EGR valve housing.

13. The integrated EGR valve housing according to claim 12, wherein the auxiliary cooling passage is connected to a circulation circuit which is formed in the flange to enclose an outer diameter of the exhaust gas circulation passage.

* * * * *